US009058502B2

(12) United States Patent
Schurig

(10) Patent No.: US 9,058,502 B2
(45) Date of Patent: Jun. 16, 2015

(54) METHODS AND SYSTEMS FOR PROVIDING ANONYMOUS AND TRACEABLE EXTERNAL ACCESS TO INTERNAL LINGUISTIC ASSETS

(75) Inventor: Joachim Schurig, Valbonne (FR)

(73) Assignee: Lionbridge Technologies, Inc., Waltham, MA (US)

( * ) Notice: Subject to any disclaimer, the term of this patent is extended or adjusted under 35 U.S.C. 154(b) by 274 days.

(21) Appl. No.: 13/321,021

(22) PCT Filed: Oct. 26, 2010

(86) PCT No.: PCT/US2010/054173
§ 371 (c)(1),
(2), (4) Date: Nov. 17, 2011

(87) PCT Pub. No.: WO2011/056613
PCT Pub. Date: May 12, 2011

(65) Prior Publication Data
US 2012/0065958 A1      Mar. 15, 2012

Related U.S. Application Data

(60) Provisional application No. 61/254,769, filed on Oct. 26, 2009.

(51) Int. Cl.
*G06F 17/28* (2006.01)
*G06F 21/62* (2013.01)

(52) U.S. Cl.
CPC .... *G06F 21/6218* (2013.01); *G06F 2221/2101* (2013.01)

(58) Field of Classification Search
CPC ............ G06F 17/30; G06F 3/48; H04L 29/06

USPC ........... 704/3, 277; 726/4; 717/109; 715/764, 715/259; 713/183, 169, 168, 165; 711/163; 709/214, 203; 707/749

See application file for complete search history.

(56) References Cited

U.S. PATENT DOCUMENTS

| | | | |
|---|---|---|---|
| 6,151,598 A | | 11/2000 | Shaw et al. |
| 6,212,635 B1* | | 4/2001 | Reardon ........................ 713/165 |
| 6,314,425 B1 | | 11/2001 | Serbinis et al. |
| 8,296,728 B1* | | 10/2012 | Webster ......................... 717/109 |
| 2002/0073163 A1* | | 6/2002 | Churchill et al. ............. 709/214 |
| 2003/0014631 A1* | | 1/2003 | Sprague ........................ 713/168 |

(Continued)

OTHER PUBLICATIONS

International Search Report and Written Opinion issued in International Patent Application No. PCT/US2010/054173; Date of Mailing: Jun. 20, 2011.

(Continued)

*Primary Examiner* — Michael Colucci
(74) *Attorney, Agent, or Firm* — Hyperion Law, LLC; Cynthia M. Gilbert

(57) ABSTRACT

The present application is directed towards methods and systems for providing anonymous and traceable external access to internal linguistic assets. The methods and systems described allow users the freedom to use a linguistic resource with the security that their identities and interactions with the resource are shielded from other users. Simultaneously, the system maintains a mechanism to trace all user's interactions with a resource to ensure the integrity of the asset is not jeopardized and to easily identify a problem with a user's access without broadcasting their identity or actions.

11 Claims, 20 Drawing Sheets

(56) References Cited

U.S. PATENT DOCUMENTS

| | | | |
|---|---|---|---|
| 2003/0191947 A1* | 10/2003 | Stubblefield et al. | 713/183 |
| 2004/0153410 A1 | 8/2004 | Nootebos et al. | |
| 2004/0205671 A1* | 10/2004 | Sukehiro et al. | 715/532 |
| 2004/0260653 A1 | 12/2004 | Tsuei et al. | |
| 2005/0038662 A1* | 2/2005 | Sarich et al. | 704/277 |
| 2005/0154913 A1* | 7/2005 | Barriga et al. | 713/201 |
| 2005/0273466 A1* | 12/2005 | Yoon | 707/100 |
| 2006/0106769 A1* | 5/2006 | Gibbs | 707/3 |
| 2006/0155993 A1* | 7/2006 | Busboon | 713/169 |
| 2006/0224611 A1* | 10/2006 | Dunn et al. | 707/102 |
| 2007/0094471 A1* | 4/2007 | Shaath et al. | 711/163 |
| 2007/0294632 A1* | 12/2007 | Toyama et al. | 715/764 |
| 2008/0005227 A1* | 1/2008 | Subbian | 709/203 |
| 2008/0120271 A1* | 5/2008 | Hunt et al. | 707/2 |
| 2008/0301175 A1* | 12/2008 | Applebaum et al. | 707/102 |
| 2009/0119286 A1* | 5/2009 | Reisman | 707/5 |
| 2009/0265765 A1* | 10/2009 | Vogler et al. | 726/4 |
| 2011/0087676 A1* | 4/2011 | Geupel | 707/749 |

OTHER PUBLICATIONS

European Patent Application No. 10 828 871.3: Extended Search Report, including Search Opinion, dated Jul. 5, 2013.

* cited by examiner

┌─────────────────────────────────────────────────────┐ ← 404
│ Publish new translation memory alias          [X]   │
│ ┌─────────────────────────────────────────────────┐ │
│ │ Number of tokens:    [1   ]                     │ │
│ │ OR                                              │ │
│ │ Emails:    [A token will be sent to every Email address in this field.] │ │
│ └─────────────────────────────────────────────────┘ │
│ ┌─────────────────────────────────────────────────┐ │
│ │ Message:   [Message that will be visible to the token subscriber.] │ │
│ │                                                 │ │
│ └─────────────────────────────────────────────────┘ │
│ ┌─Alias Permissions──────────────────────────────┐  │
│ │ Import:                    ☐                   │  │
│ │ Export all segments:       ☐                   │  │
│ │ Export own segments:       ☑                   │  │
│ │ Connect background links:  ☑                   │  │
│ │ Use as background link:    ☐                   │  │
│ └────────────────────────────────────────────────┘  │
│                              [ Create ] [ Cancel ]  │
└─────────────────────────────────────────────────────┘

Fig. 4B

Publish new translation memory alias                                  ⊠

Number of tokens:     | 1 |
OR
Emails:               | A token will be sent to every Email address in this field. |

Message:              | Message that will be visible to the token subscriber. |

┌─Alias Permissions──────────────────────────
│ Import:                        ☐
│ Export all segments:           ☐
│ Export own segments:           ☑
│ Connect background links:      ☑
│ Use as background link:        ☐

[ Create ]  [ Cancel ]

Publish new glossary alias                                            ☒

Number of tokens:    [1]
OR
Emails:              [A token will be sent to every Email address in this field.]

Message:             [Message that will be visible to the token subscriber.]

┌─Alias Permissions──────────────────────────────┐
Import:                    ☐
Export:                    ☐
Use as terminology link:   ☑

[Create]  [Cancel]

Publish new review alias                                              ☒

| Number of tokens: | 1 |
| OR | |
| Emails: | A token will be sent to every Email address in this field. |

Message: | Message that will be visible to the token subscriber.

Alias Permissions
Connect glossaries:   ☑

[ Create ]  [ Cancel ]

Fig. 4G

| | | | | |
|---|---|---|---|---|
| ⬚ Reload | ⊖ Revoke | Show token | Show in tree | |
| Alias id ▼ | Alias type | Name | ▫ | Target tenant |
| 5 | Translation Memory | UI_Legacy1_TM | | Recipient Organization ID |

METHODS AND SYSTEMS FOR PROVIDING ANONYMOUS AND TRACEABLE EXTERNAL ACCESS TO INTERNAL LINGUISTIC ASSETS

CROSS-REFERENCE TO RELATED APPLICATIONS

This application is a national phase application of International Application No. PCT/US2010/054173, filed Oct. 26, 2010, which claims the benefit of priority of U.S. Provisional Application No. 61/254,769, filed Oct. 26, 2009, both of which are incorporated herein by reference.

FIELD OF INVENTION

The present invention relates to methods and systems for providing computer-aided language translations. In particular, the present invention relates to systems and methods for providing anonymous and traceable external access to internal linguistic assets.

BACKGROUND

In many available translation systems, linguistic assets have become more sophisticated and refined over time and incorporate local colloquialisms and to mirror spoken language. In some cases, linguistics assets, such as databases or translation mechanisms, are large and cannot be locally downloaded without jeopardizing the integrity of the asset. The solution is often to store the asset on a server so that the resource can be updated regularly and grow without overwhelming a user's machine or consume all the resources of a user's computer. A benefit to centrally stored translation resources is that it can be accessed by multiple individuals or parties. It becomes necessary to ensure the correct permissions are set to assets so that they are not denigrated. One problem that arises when assets are centrally stored and accessed by many parties is that the users may be able to identify the other parties who also access the resource. This may cause problems in business situations where parties wish to remain anonymous to other users or need to have access, limited or otherwise, to resources but do not wish to broadcast their identity. However, it is also necessary to have a mechanism to trace access of users to maintain the integrity of a translation resource.

BRIEF SUMMARY

The present application is directed towards methods and systems for providing anonymous and traceable external access to internal linguistic assets. The methods and systems described allow users the freedom to use a linguistic resource with the security that their identities and interactions with the resource are shielded from other users. Simultaneously, the system maintains a mechanism to trace all user's interactions with a resource to ensure the integrity of the asset is not jeopardized and to easily identify a problem with a user's access without broadcasting their identity or actions.

In one aspect, the present invention relates to a method for providing anonymous and traceable access to linguistic assets. A first workspace grants to a first client responsive to a first user request, access to a linguistic asset residing in the first workspace. The first workspace generates an alias token and transmits the alias token to a second client. The second workspace grants to a second client responsive to a second user request, access to the second workspace. The first workspace grants to the second workspace access to the first workspace. The second workspace then generates an aliased object for the linguistic asset residing in the first workspace. The aliased object is generated using the received alias token and is stored in the second workspace. The aliased object conceals an identity of a user having access to the linguistic asset. The second client accesses via the aliased object in the second workspace the linguistic asset. The aliased object grants the second client access to the linguistic asset residing in the first workspace.

In some embodiments, the linguistic asset may be a translation memory or a glossary asset. In some embodiments, the first workspace and the second workspace reside on a first server. In some embodiments, the first workspace resides on a first server and the second workspace resides on a second server. In some embodiments, the second workspace stores with the linguistic asset a group identity of a user having access to the second workspace modifying the linguistic asset. In some embodiments, the second workspace stores a group identity of a user having access to the second workspace and re-transmitting the alias token.

In some embodiments, the second workspace grants to a third workspace access to the second workspace. The second workspace generates a second alias token for the aliased object and storing the second aliased object in the third workspace. The second aliased object conceals an identity of a user having access to the third workspace. The second workspace transmits to a third client, the second alias token. The third workspace generates a second aliased object for the first aliased object residing in the second workspace using the received second alias token and stores the second aliased object in the third workspace. The second aliased object grants the third client access to the linguistic asset residing in the first workspace via the aliased object.

In some embodiments, the third workspace stores with the linguistic asset a group identity of a user having access to the second workspace modifying the linguistic asset. In some embodiments, the third workspace stores a group identity of a user having access to the second workspace and re-transmitting the alias token. In some embodiments, the second workspace stores only the group identity of a user who generated the aliased object using the alias token.

In another aspect, the present invention is directed to a system for providing anonymous and traceable access to linguistic assets. The system includes a first client device, a second client device, and a server. The server provides a first workspace and a second workspace. The alias manager executing in the first workspace generates an alias token for a linguistic asset and transmits the alias token to the second client. The access manager executing in the first workspace grants to the first client responsive to a first user request, access to the linguistic asset residing in the first workspace. The access manager in the first workspace also grants to the second workspace access to the first workspace. A second access manager executing in the second workspace grants to the second client responsive to a second user request, access to the second workspace. A second alias manager executing in the second workspace generates an aliased object for the linguistic asset residing in the first workspace using the received alias token and storing the aliased object in the second workspace. The aliased object conceals an identity of a user having access to the linguistic asset. The aliased object grants the second client access to the linguistic asset residing in the first workspace.

In some embodiments, the second workspace stores with the linguistic asset a group identity of a user having access to the second workspace modifying the linguistic asset. In some embodiments, the second workspace stores a group identity of a user having access to the second workspace and retransmitting the alias token. In some embodiments, the third workspace resides on the server of the first workspace and the second workspace. In some embodiments, the third workspace resides on a second server.

In some embodiments, the second workspace grants access to a third workspace to the second workspace. A third alias manager executing in the third workspace generates a second alias token for the aliased object responsive to a request from a third client and stores the second aliased object in the third workspace. The second aliased object conceals an identity of a user having access to the third workspace. The third client receives the second alias token. The third workspace generates a second aliased object for the first aliased object residing in the second workspace using the received second alias token and stores the second aliased object in the third workspace. The second aliased object grants the third client access to the linguistic asset residing in the first workspace via the aliased object.

In some embodiments, the third workspace stores with the linguistic asset a group identity of a user having access to the second workspace modifying the linguistic asset. In some embodiments, the third workspace stores a group identity of a user having access to the second workspace and re-transmitting the alias token. In some embodiments, the second workspace stores only the group identity of a user who generated the aliased object using the alias token.

The details of various embodiments of the invention are set forth in the accompanying drawings and the description below.

BRIEF DESCRIPTION OF DRAWINGS

The foregoing and other objects, aspects, features, and advantages of the invention will become more apparent and better understood by referring to the following description taken in conjunction with the accompanying drawings, in which:

FIG. 4B is a screen shot depicting one embodiment of a user interface allowing a user to publish a new alias for a translation memory object;

FIG. 4E is a screen shot depicting one embodiment of a user interface allowing a user to modify the access rights of a recipient of an alias for a translation memory object;

FIG. 4F is a screen shot depicting one embodiment of a user interface allowing a user to modify the access rights of a recipient of an alias for a glossary object;

FIG. 4G is a screen shot depicting one embodiment of a user interface allowing a user to modify the access rights of a recipient of an alias for a review object;

FIG. 5C is a screen shot depicting one embodiment of a user interface displaying an identification of an organization receiving access to a published alias;

Figure 1A:
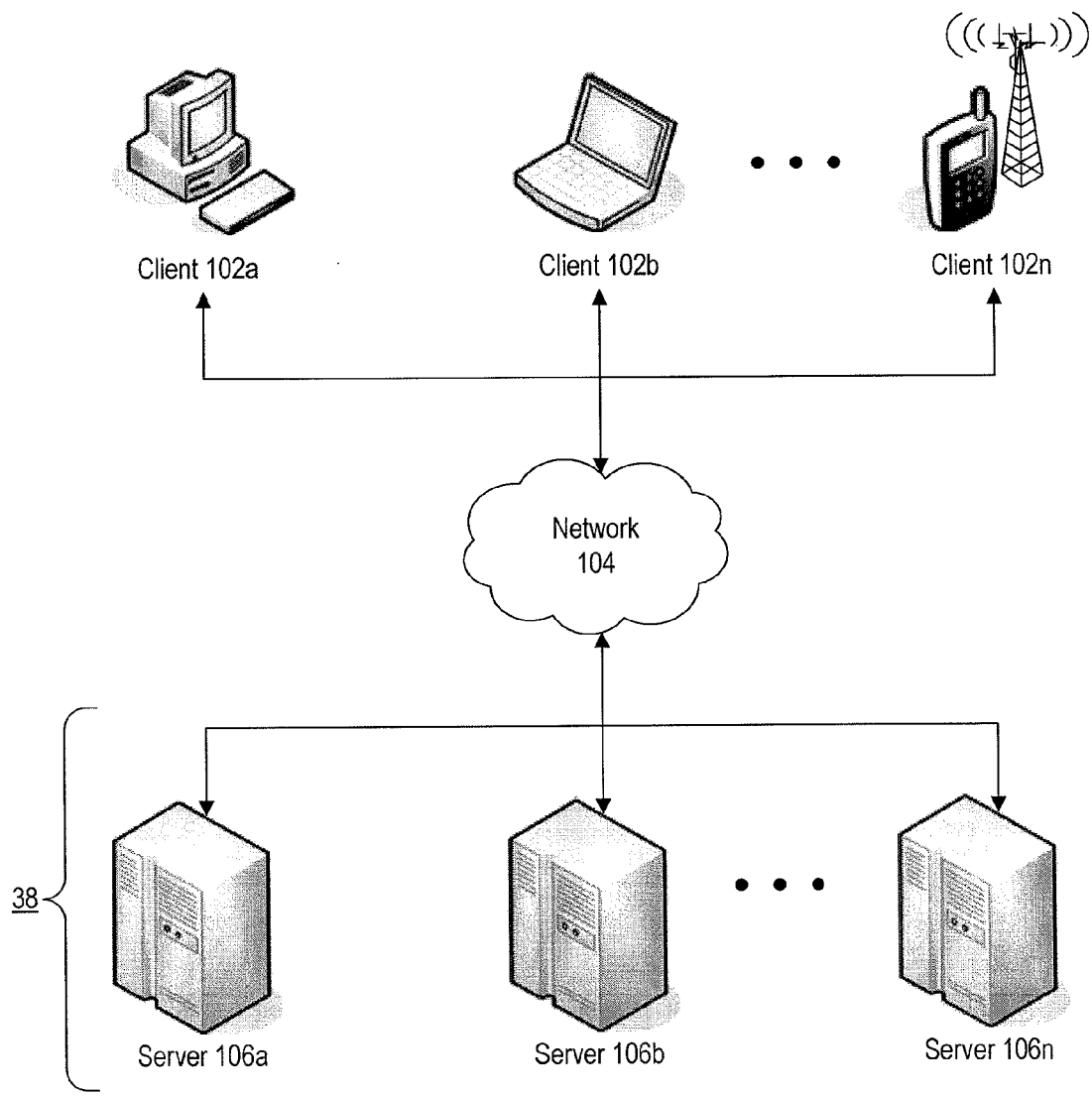
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Prior to discussing the specifics of embodiments of the systems and methods for providing anonymous and traceable access to internal assets, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

The servers 106 may be geographically dispersed from each other or from the clients 102 and communicate over a network 104. The network 104 can be a local-area network (LAN), such as a company Intranet, a metropolitan area network (MAN), or a wide area network (WAN), such as the Internet or the World Wide Web. The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38. In another of these embodiments, the servers 106 may be geographically dispersed. In other embodiments, a server farm 38 may be administered as a single entity. In still other embodiments, the server farm 38 comprises a plurality of server farms 38. The servers 106 within each server farm 38 can be heterogeneous—one or more of the servers 106 can operate according to one type of operating system platform (e.g., WINDOWS NT, WINDOWS 2003, WINDOWS 2008, manufactured by Microsoft Corp. of Redmond, Wash.), while one or more of the other servers 106 can operate on according to another type of operating system platform (e.g., Unix or Linux).

The servers 106 of each server farm 38 do not need to be physically proximate to another server 106 in the same server farm 38. Thus, the group of servers 106 logically grouped as a server farm 38 may be interconnected using a wide-area network (WAN) connection or a metropolitan-area network (MAN) connection. For example, a server farm 38 may include servers 106 physically located in different continents or different regions of a continent, country, state, city, campus, or room. Data transmission speeds between servers 106 in the server farm 38 can be increased if the servers 106 are connected using a local-area network (LAN) connection or some form of direct connection.

A server 106 may be referred to as a file server, application server, web server, proxy server, or gateway server. In one embodiment, the server 106 provides functionality of a web server. In some embodiments, the web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the SUN JAVA web server products provided by Sun Microsystems, of Santa Clara, Calif., or the BEA WEBLOGIC products provided by BEA Systems, of Santa Clara, Calif.

The clients 102 may be referred to as client nodes, client machines, endpoint nodes, or endpoints. In some embodiments, a client 102 has the capacity to function as both a client node seeking access to resources provided by a server and as a server providing access to hosted resources for other clients 102a-102n. A client 102 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 102. The application can use any type of protocol and it can be, for example, an HTTP client, an FTP client, an Oscar client, or a Telnet client.

Figure 1B:
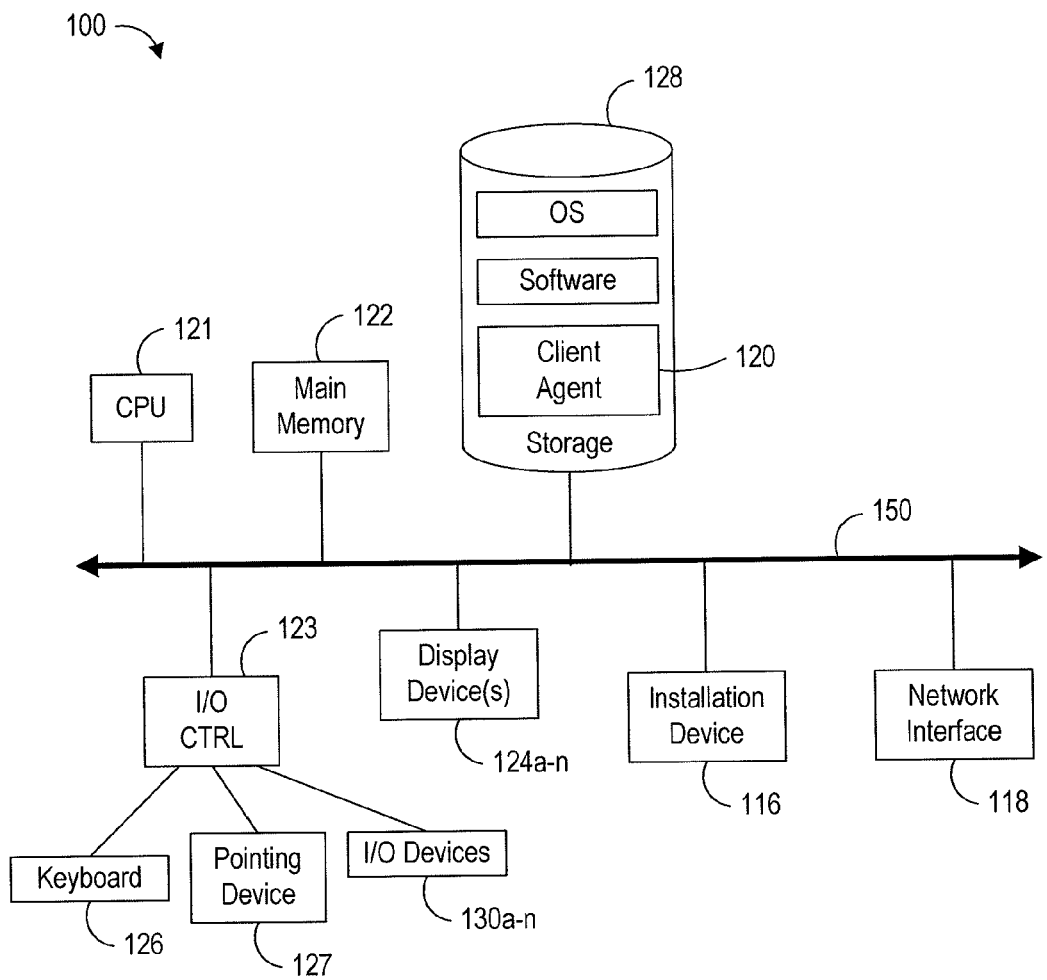
FIG. 1B is a block diagram depicting one embodiment of a computing device useful in connection with the methods and systems described herein.

The client 102 and server 106 may be deployed as and/or executed on any type and form of computing device, such as a computer, network device or appliance capable of communicating on any type and form of network and performing the operations described herein. FIG. 1B depicts a block diagram of a computing device 100 useful for practicing an embodiment of the client 102 or a server 106. As shown in FIG. 1B, each computing device 100 includes a central processing unit 121, and a main memory unit 122. As shown in FIG. 1B, a computing device 100 may include a visual display device 124, a keyboard 126 and/or a pointing device 127, such as a mouse.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

A wide variety of I/O devices 130a-130n may be present in the computing device 100. Input devices include keyboards, mice, trackpads, trackballs, microphones, and drawing tablets. Output devices include video displays, loudspeakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive portable USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIG. 1B typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; and OS/2, manufactured by International Business Machines of Armonk, N.Y. A server 106 and a client 102 may be heterogeneous, executing different operating systems.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. For example, in one of these embodiments, the computing device 100 is a TREO 180, 270, 600, 650, 680, 700p, 700w/wx, 750, 755p, 800w, Centro, or Pro smart phone manufactured by Palm, Inc; the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry portable or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other portable mobile device supporting Microsoft Windows Mobile Software. Moreover, the computing device 100 can be any workstation, desktop computer, laptop or notebook computer, server, portable computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, a display on a mobile computing device 100 includes a touch-screen. In one of these embodiments, a touch-screen sensor includes a touch-responsive surface that detects touch input from a user of the mobile computing device 100. In another of these embodiments, the touch-screen sensor redirects an identification of a location of the touch input on the touch-responsive surface to an operating system executing on the mobile computing device 100. In another of these embodiments, the operating system redirects the identification of the location of the touch input to a software application for processing. In still another of these embodiments, the software application correlates the location of the touch input with a displayed user interaction element and processes the interaction on behalf of the user.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Inc., of Cupertino, Calif.

Figure 2A:
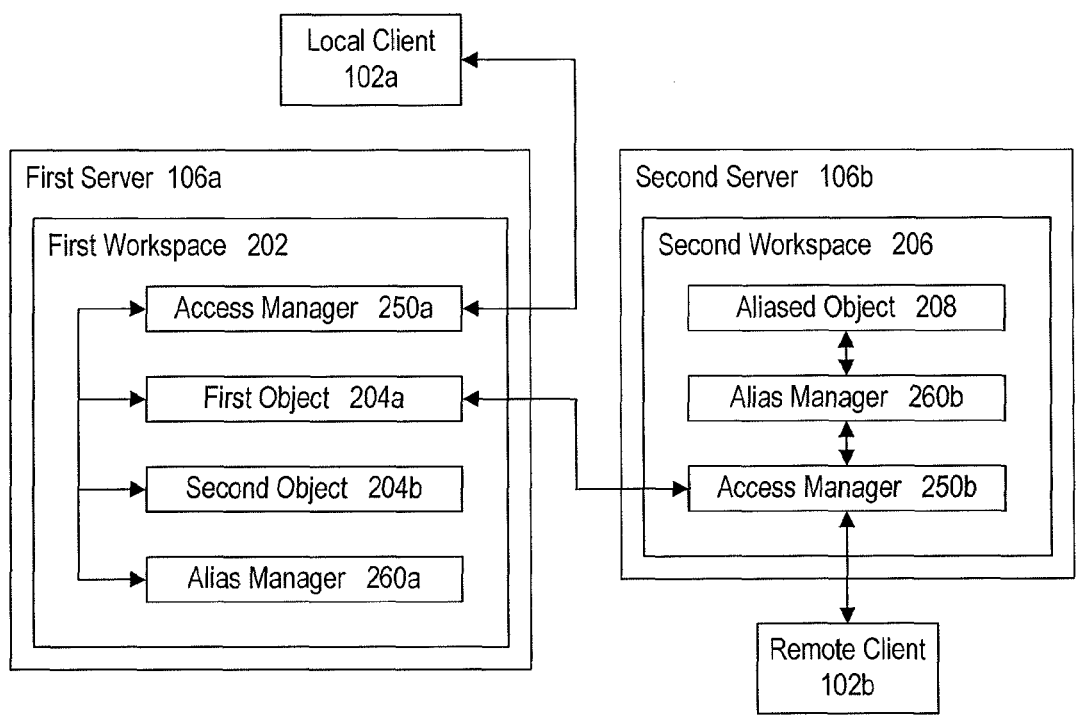
FIG. 2A is a block diagram depicting an embodiment of a system for providing anonymous and traceable access to assets.

Referring now to FIG. 2A, a block diagram depicts one embodiment of a system for providing anonymous and traceable access to assets. In one embodiment, to resolve problems that arise in sharing access to data for collaboration across organizations, while protecting individual contributors' identities from inappropriate access, the methods and systems described herein provide functionality for data aliasing.

In some embodiments, a solution is provided to allow sharing of data, including linguistic assets such as translation memory and glossary data, across organizations or groups by implementing an aliasing system for data objects. In some embodiments, the data can be stored in data structures, such as nodes, tables, glossaries, databases or other type of storage. These data structures may be known as data objects, objects, language objects, linguistic objects, or similar terminology. In one embodiment, the organization or group that owns a data object can create one or more exports for an object and share a token (also known as a key) for an export with another organization (which may be referred to as a receiving organization). In another embodiment, a receiving organization adds a new link object referring to the exported object by inputting the token and adding a local name and other metadata. In still another embodiment, users at the receiving organization can interact with the linked object as if it were an object residing in the receiving tenant workspace. In yet another embodiment, the receiving organization may export the linked object to other users or organizations.

Referring still to FIG. 2A, and in greater detail, the system includes a first server 106a, a second server 106b, a local client 102a and a remote client 102b. In one embodiment, the access manager 250 executing on the first server 106a provides a user of the local client 102a with access to a first workspace 202. In another embodiment, the access manager 250 executing on the first server 106a provides a user of the local client 102a with access to at least one object 204 stored within the first workspace 202. In still another embodiment, a second access manager 250b executing on the second server 106b provides a user of the remote client 102b with access to a second workspace 206. In still even another embodiment, the second access manager 250b executing on the second server 106b provides a user of the remote client 102b with access to a second workspace 206, which contains an alias 208 for a first object 204a; the user of the remote client 102b may access the first object 204a stored by the first workspace 202 via the alias 208 that is generated by the alias manager 260.

In some embodiments, the access manager 250 may comprise hardware, software, or any combination of hardware and software that creates, modifies or otherwise interact with the permission settings to a workspace executing on a client device. The access manager may also be called a permissions manager, access agent, permissions generator, or similar. The access manager 250 may comprise an application, program, script or other form of executable instructions. The access manager 250 may comprise any logic, function or operation to create, maintain, modify or process permissions to a client device 102. In some embodiments, the access manager 250 may comprise policies that determine access to the workspace 202 or objects 204. In some embodiments, the policy is modified by an administrator. In other embodiments, the policy may be modified by a current user. In other embodiments, the access manager may permit only a small number of administrators, pre-determined at manufacture or pre-determined upon loading of the system.

In some embodiments, the alias manager 260 may comprise hardware, software, or any combination of hardware and software that creates, modifies, stores, or otherwise processes aliases to an object 204 in a workspace 202. The alias manager may also be called an alias engine, alias generator, object aliaser, or similar. The alias manager 260 may generate alias using random alpha-numeric symbols. In some embodiments, the alias may also comprise non-alpha numeric symbols. In other embodiments, the alias generated by the alias manager may be generated using an IP address as a seed. In other embodiments, the alias generated by the alias manager may comprise randomly generated sequences of number, letters, symbols or any combination thereof. The alias manager 260 may store the generated aliases in storage executing on the server on which the alias manager 260 resides. In other embodiments, the alias manager 260 may store the generated aliases and corresponding user identities in a table, database, or other data structure stored on the server 106. In other embodiments, the alias manager 260 may store the generated aliases and corresponding user identities in a data structure as described herein on a separate server 106. In still other embodiments, the alias manager 260 may store the generated aliases and corresponding user identities in a data structure that is stored in multiple locations.

In some embodiments, an alias 208 is a link to the first object 204a (for example, a hyperlink allowing access across a network 104 to data stored on the first server 106a). In other embodiments, the alias 208 is represented to a user of the second workspace 206 as a local copy of the object 204, although the object 204 does not reside locally. In still other embodiments, an alias is a system-internal reference to the object in question, allowing users in one organization to access objects in a workspace owned by a different organization. In further embodiments, a subscriber will create an alias token (e.g., a system-generated number) and transmit (e.g., email) the alias token to a different subscriber (e.g., a subscriber outside the system managed by the subscriber's organization). In one of these embodiments, the client device 102 receiving the token will use the token to then generate an alias to the object in question, and be able to access the object across a network 104.

In some embodiments, a user may generate multiple aliases 208 at once, selecting multiple assets and generating multiple tokens. In other embodiments, functionality is provided making it easy for users to send tokens to multiple recipients. In still other embodiments, a user interface is provided allowing users to generate and transmit tokens. In other embodiments, an issuer provides a user-friendly name for an alias. In some embodiments, the system generates a number identifying the alias. In further embodiments, both the issuer and receiver are provided with an identifier with which they may refer to aliased objects.

In some embodiments, a user may generate an alias token which can be sent to multiple people. The first user to use the token to log into a workspace and access the aliased object using the alias token maintains control over the aliased object. The other users who received the alias token will be denied access to the aliased object.

In some embodiments, a workspace providing access to data objects is assigned to an organization. In other embodiments, the workspace stores a copy of the object 204. In further embodiments, an organization having access to a workspace is referred to as a "tenant" and may be described as having a "tenancy." In some embodiments, multiple workspaces may exist on a single server. In other embodiments, workspaces may exist on multiple servers. In still other embodiments, workspaces may exist in a computing cloud, in which case the workspace may not exist or persist on a single workspace, but rather would be available via the computing cloud.

In one embodiment, an organization assigns access to the objects 204 to individuals within the organization; for example, an administrator may set an access control policy in the access manager 250 that allows a user to access an object 204 either through direct access to a first server 106*a* or from a local client 102*a* accessing the first server 106*a* across a network 104. In another embodiment, however, to assign access to the objects 204 to individuals external to the organization, an administrator or other user of a first server 106*a* may generate an alias token to be used by a third party to access the linguistic asset through an alias 208. The alias token is transmitted to a user and will be used by the second user to log into an available workspace 206 and access the aliased object using the alias token. In still another embodiment, an administrator or other user of a first server 106 may direct the creation of the alias 208 by the alias manager 260 within the second workspace 206, which may, for example, be operated by or accessible to users of a second organization.

In some embodiments, the organization that is assigned to a particular workspace is considered to be an owner of the objects within the workspace and is authorized to grant access to the objects directly or via aliases. In one of these embodiments, an organization that has control over which objects 204 are accessed directly or via alias by users internal or external to the organization is able to provide controlled access to data objects across organizations through the access manager 250 and the alias manager 260. In another of these embodiments, organizations may provide object aliases 208 for a plurality of organizations. In still another of these embodiments, the organization defines a type of permission for the usage of the data accessed via a particular alias 208; for example, users of one a second workspace 206 may be granted a type of permission that allows them to access and modify the object 204 while users of a third workspace may be granted a type of permission that allows them to access but not to modify the object 204. In this embodiment, permissions may include, without limitation, the ability to read an object, the ability to write to or modify an object, list access, and delete access. In yet another of these embodiments, the members of the organization that owns the data in the first workspace 204 (for example, a user of the local client 102*a* with appropriate authorization) may modify a type of access granted by a particular alias 208.

Figure 2B:
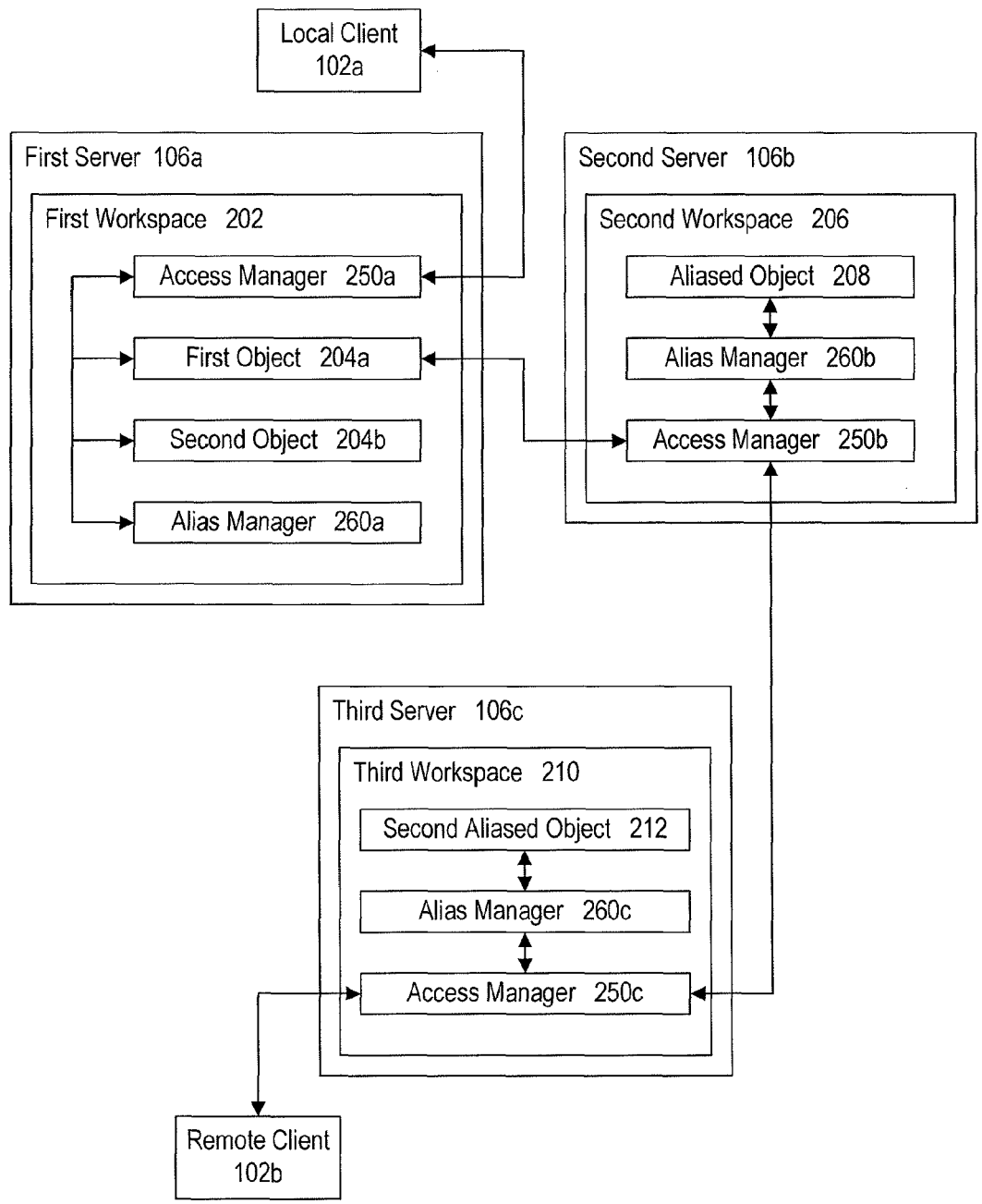
FIG. 2B is a block diagram depicting another embodiment of a system for providing anonymous and traceable access to assets.

Referring now to FIG. 2B, a block diagram depicts another embodiment of a system for providing anonymous and traceable access to objects. In one embodiment, a second workspace 206 stores an alias 208 for a first object 204*a*—which is owned by an organization that stores the first object 204*a* in a first workspace 204. Organizations may create chains of aliases linked to the first object 204*a* via the alias 208 generated by the alias manager 260*a*. For example, a user of the second workspace 206 may create a second alias (an alias 212) and export the alias to a third workspace 210 on a third server 106*a*, where it is received by the access manager 250*c* and processed by the second alias manager 260*b*. The alias 212 provides a user of a remote client 102*b* with access to the alias 208, which may be used to access the first object 204*a*. The alias 212 may be provided to users within the receiving organization or to users within a third organization, external to both the organization that owns the first object 204*a* and the organization that owns the alias 208. In some embodiments, a creator of an alias 212 may provide users of the alias 212 with more limited access rights than those granted by the creator of an alias 208; for example, an owner of an object 204 may authorize users of the alias 208 to access and modify the object 204 while the creator of an alias 212 may only allow users of the alias 212 to access the object 204 without making modifications. In other embodiments, the creator of the alias 212 provides users of the alias 212 with the same set of rights granted by the creator of the alias 208.

Figure 2C:
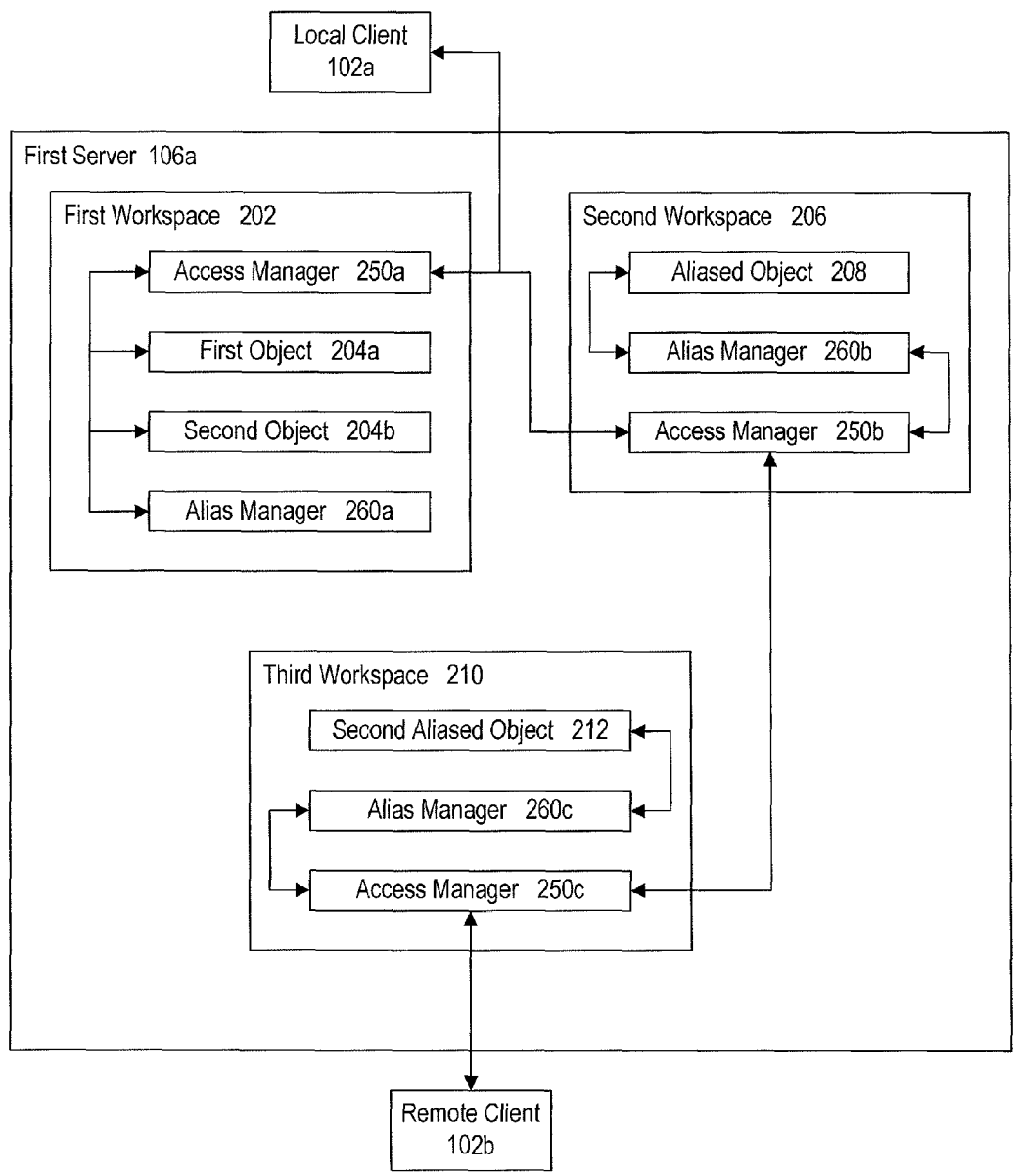
FIG. 2C is a block diagram depicting another embodiment of a system for providing anonymous and traceable access to assets.

Now referring to FIG. 2C, a block diagram depicts another embodiment of a system for providing anonymous and traceable access to objects. In some embodiments, multiple workspaces reside on the same server, as depicted in FIG. 2C. Several clients may access the different workspaces on the server 106*a*. Each workspace is isolated from each other and no data regarding usage or any other type of data is permitted to pass between the workspaces unless an explicit connection has been made. In some embodiments, workspaces may reside on different servers, as depicted in FIGS. 2A-2B. In some embodiments, the workspaces are identified by the server on which they reside. In some embodiments, such associations between the servers and workspaces do not exist, especially if the workspaces reside in a computing cloud and may be frequently relocated among servers. When workspaces reside in a computing cloud, then they may not be associated with a specific server.

In one embodiment, a modification to an object 204 is logged by the alias manager 260. In another embodiment, an identity of a user modifying an object 204 is stored with the object 204 by the alias manager 260. In still another embodiment, however, access to a stored identify of a user modifying an object 204 is restricted. In some embodiments, access to the identity of a user modifying an object 204 is restricted to an organization to which the user belongs. By way of example, and without limitation, a first user of the second workspace 206 shown in FIG. 2B may access the identity of a second user accessing, via an alias 208, an object 204 and modifying the object because both users are users of the same workspace, while a user of the first workspace 204 may not access the identity of the second user but may access the name of the organization allowed to access the second workspace 208. Similarly, and as another example, a user of the second workspace may access the identity of an organization accessing the alias 212 but may not access the identity of an organization or user that accessed the object 204 via an alias to the alias 212 (e.g., a subcontractor of the organization). In one of these embodiments, because aliases can be issued for aliases, the identity of the final organization that accessed the original data may be masked from the owner of the data. In another of these embodiments, this functionality allows each an organization in a chain of organizations accessing an object 204 to identify organizations to which it provided an alias but may not be allowed to identify organizations that were granted further aliases, which provides anonymity for those entities. In an embodiment in which two organizations wish to collaborate on the creation, modification, or management of data but a first organization wishes to protect the identity of its users from a second (such as, for example, valued sub-contractors whom the first organization does not want the second organization accessing directly or employees whose personal data, including identity, the first organization may want, or be required, to protect). In one of these embodiments, the second organization has the option of working with the first organization to trace the identity of a user that has modified an object 204, but does not have the ability to access the user identity without cooperation from the first organization. This is an example of an embodiment in which the methods and systems described herein provide access to objects that is both anonymous and traceable.

In one embodiment, an organization that gives more than one alias on the same data to other organizations may allow those other organizations to see the origin of manipulated data being those respective organizations, or not. In the later case, the own organizational name will be displayed as origin organization. This can be decided a) as a general rule for all aliases generated for the data b) on an alias-by-alias base for each receiving alias c) on an alias-by-alias base for each contributing alias.

In some embodiments, in order to hide data and metadata across organizations and to provide flexible security for the system a number of rules should be configurable on the publisher side of the link. In one of these embodiments, the restrictions are all on the organization level and not on a per user level. In another of these embodiments, by of example, access restrictions may include, without limitation, the following:

1. What can be exported (e.g., All, Subscriber added)
2. What operations are allowed for the subscriber.
3. Hide information on origin of data from other subscribers. This may include optionally allow faking the origin of a translation as coming from the publisher of the link instead of from the actual subscriber that added the data if the adding subscriber is different from the requesting subscriber.

In some embodiments, when a link is established, the two involved organization agree on a mutual shared secret different from the initial token to use during normal operations. In one of these embodiments, the organizations also exchange the necessary data to display each other's names, and display the rights on the object. In another of these embodiments, the cross-organization operations will be done through messages, which hide the details of where the other organization is located (same/different server) for both initiator and target. In still another of these embodiments, this may initially be the userid of the user and each time it traverse a alias link it may be pre-pended with the organization id of the subscribing organization. In yet another embodiment, the system may not display the full path to a segment, only a local path will be decoded. The following is an example of one embodiment of this naming convention: User1(id=1234) in Tenant1(id=23) adds a segment to object 204a owned by Tenant3 and provided through 2 levels of links Tenant2(id=47) and Tenant3 (id=96); Tenant3(Data Object 204 Owner)-alias->Tenant2-alias->Tenant1-User1 adds segment; the patch would end up named as T47:T23:U1234; however, the Owner (tenant3) will only see Tenant2 as the adding user. Tenant2 will only see Tenant1 as the adding user and Tenant1 and User1 will see User1 as the adding user. In some embodiments, this can be accomplished by each level removing itself from the head of the list when passing it on; if the receiver is not next in the list, the entire path may be replaced according to the link configuration.

In some embodiments, functionality is provided allowing privileged users of a workspace 204 to view a list of aliases, tokens that haven't yet been used to generate aliases, and the assets that the tokens/aliases correspond to. In one of these embodiments, before generation of an alias 208, a privileged user may view an identification of a user creating a token, an alias token, and a date issued. In another of these embodiments, after generation of an alias 208, a privileged user may view an identification of a user creating a token, an organization to which the token has been provided and a date issued. In other embodiments, functionality is provided allowing privileged users of a workspace 204 to remove, cancel, or revoke an issued alias.

The methods and systems described herein may be implemented to allow cross-organizational collaboration on objects storing any type of data. Although the following examples describe the use of these methods and systems in connection with a system for translation of data from a source language to a target language, it should be understood that these methods and systems are not limited to language translation environments.

Figure 3:
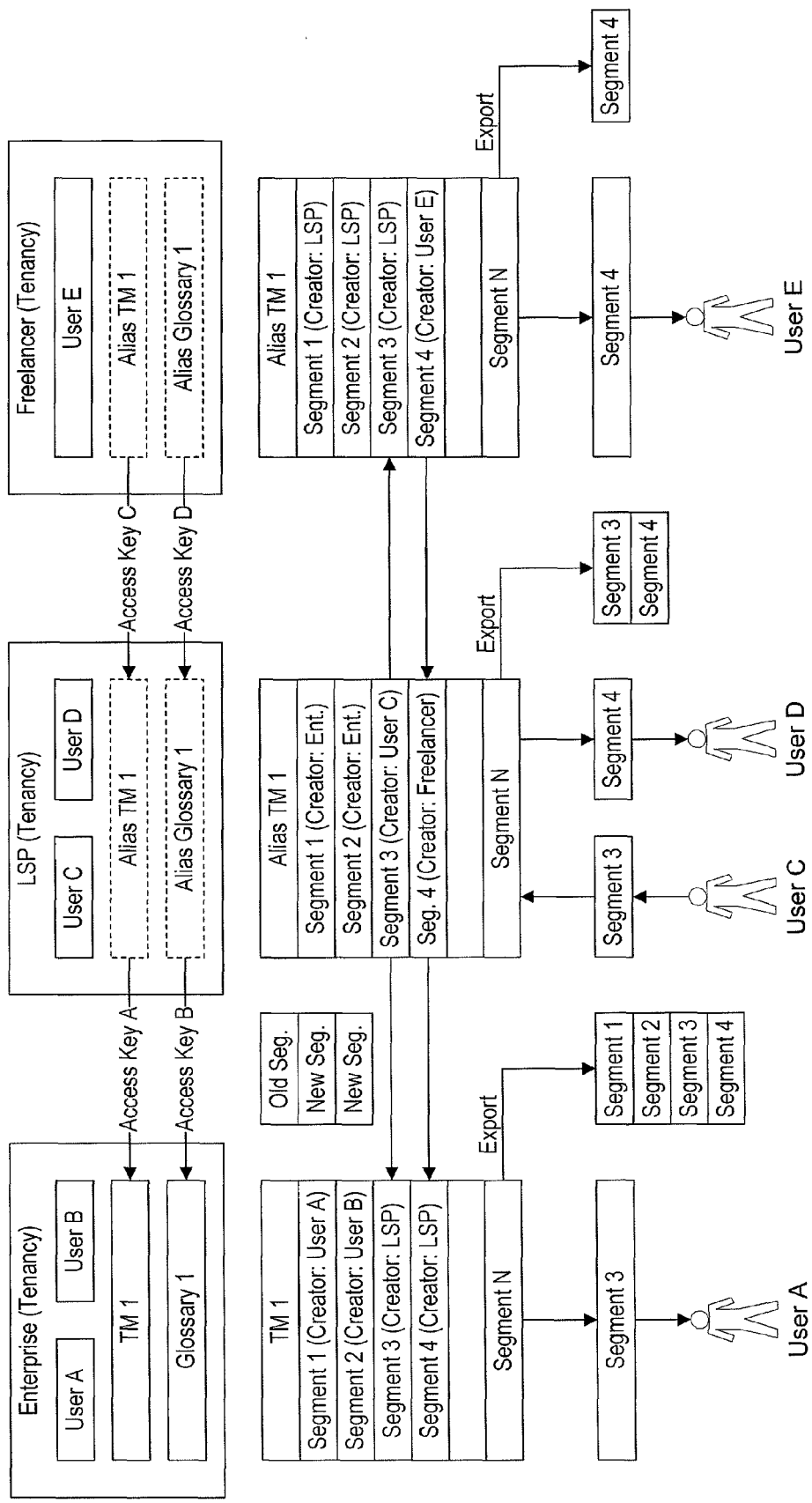
FIG. 3 is a block diagram depicting one embodiment of methods and systems for providing anonymous and traceable external access to internal linguistic assets.

The following illustrative examples, discussed in conjunction with FIG. 3, show how the methods and apparatus discussed above can be used to provide anonymous and traceable external access to internal linguistic assets.

An Enterprise Subscriber Aliases a Translation Memory and Glossary for Use on an Outsourced Project In one embodiment, an enterprise subscriber has a project for outsourcing to an LSP provider subscriber. In another embodiment, a privileged user in the enterprise tenancy modifies the translation memory (TM) and glossary properties for the TM and glossary assets to be used on the project, creating aliases that link TM1, TM2, Gloss1, Gloss2, etc. In still another embodiment, the enterprise user generates an access token for downstream providers who should have access to the aliased assets. In yet another embodiment, the enterprise subscriber provides the token to the LSP subscriber.

In one embodiment, the LSP provider subscriber in turn generates access token for freelance provider subscribers who need to use the aliased TM, and sends that access information to the freelance subscribers outside the system. In another embodiment, the enterprise subscriber cannot see the users that the LSP assigns to the aliased assets, nor can he see that the LSP created additional aliases on the aliased assets. In still another embodiment, when the enterprise subscriber views segments in the TM that were added by freelance subscribers working for the LSP, the creation user name is the LSP tenancy name—not the individual freelance subscribers.

An LSP User Saves Segments to an Aliased TM and Performs a TM Export

In one embodiment, a staff linguist working for an LSP user with access to an aliased TM saves a translation. In another embodiment, all other users with access to the aliased TM can see the new segment. In still another embodiment, the creation user is listed as the tenant who generated the access token. In another embodiment, the LSP staff linguist user performs a TM export. In still another embodiment, only the segments contributed by users in his tenancy or by users in tenancies, which received aliases by his tenancy are exported. In still even another embodiment, users in the enterprise subscriber tenancy with export access to the aliased TM can export all segments from the aliased TM. In yet another embodiment, behavior is identical for both new and updated segments saved to the TM.

An Enterprise Subscriber User Saves a Segment to a TM

In one embodiment, an LSP subscriber user with access to an aliased TM saves a segment. In another embodiment, other users in tenancies with access to the asset can see/use the new segment but can't export it. In still another embodiment, users in the enterprise tenancy with export access to the aliased TM can see/use and export this and all segments in the original TM. In yet another embodiment, behavior is identical for both new and updated segments An LSP Subscriber Aliases an Enterprise Subscriber's TM for Use by a Freelance Subscriber In one embodiment, an LSP subscriber creates an alias for an already-aliased enterprise subscriber TM, and gives access to a freelance subscriber. In another embodiment, the freelance subscriber saves a new segment to the TM. In still another embodiment, when the freelance subscriber retrieves this segment, he can see that he is the creation user. In still even another embodiment, the freelance subscriber exports the TM. In yet another embodiment, the export file contains only the segments that were saved from users in his tenancy.

In one embodiment, the LSP subscriber does an export of the TM. In another embodiment, the export file contains segments from all freelancers that the LSP has granted access to, and from, all users in his own tenancy. In still another embodiment, when the enterprise subscriber sees the segments saved to TM by the freelance subscriber users, only the name of the LSP tenant is displayed as the value for creation/update users. In still even another embodiment, the enterprise subscriber does an export of the TM and all segments are exported. In yet another embodiment, behavior is identical for both new and updated segments.

Publishing an Alias

Figure 4A:
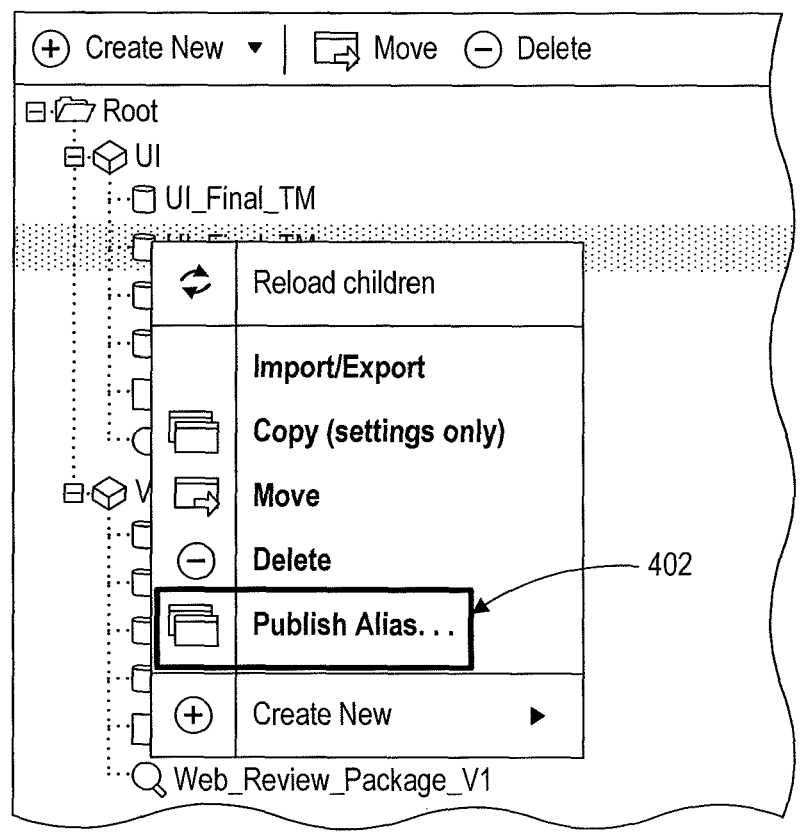
FIG. 4A is a screen shot depicting one embodiment of a user interface allowing a user to create and share an alias.

Referring now to FIG. 4A, a screen shot depicts one embodiment of a user interface allowing a user to create and share an alias 208. In one embodiment, a user of a first organization interacts with the interface 402 to make an object 204—such as a translation memory, a glossary, a review package, or other data object—available to a user in a second organization.

Referring now to FIG. 4B, a screen shot depicts one embodiment of a user interface allowing a user to publish a new alias 208 for a translation memory object 204. In one embodiment, a user of a first organization interacts with the interface 404 to specify the details of a new alias 208 and to share the alias 208 with a user in a second organization. In other embodiments (not shown), the user interface 404 is modified to identify a type of data object 204 for which an alias 208 is being generated; for example, the user interface 404 may display different user interface elements allowing users to specify the details of a new alias for a translation memory object than the user interface might display for specifying the details of a new alias for a glossary object, or for another type of data object.

In further embodiments, the user interface allows a user or administrator to specify the level of write access for the alias. In some embodiments, the user interface permits a user to add or specify a language or multiple languages of the linguistic asset. In some embodiments, the user interface has an option to re-publish an existing alias. In other embodiments, the user interface has an option to display the name of background links.

Figure 4C:
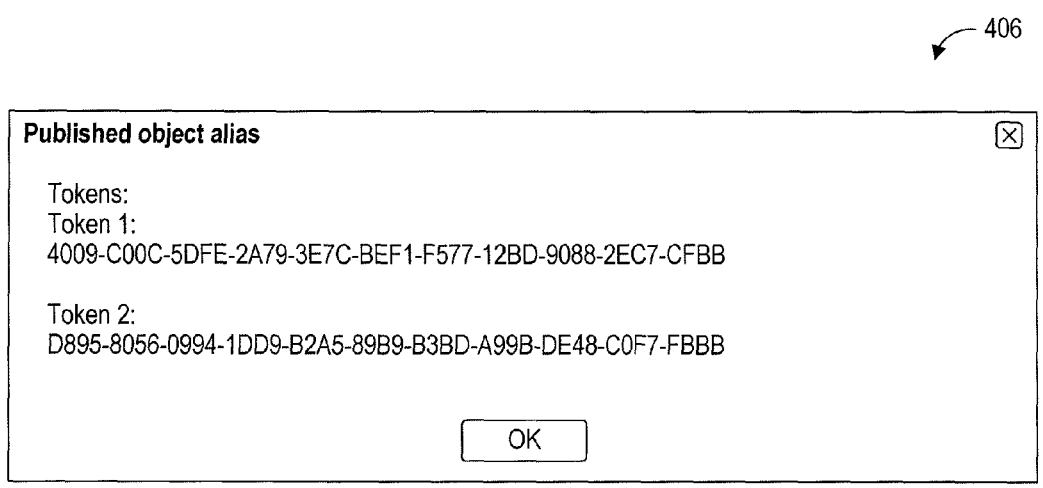
FIG. 4C is a screen shot depicting one embodiment of a user interface confirming generation of a new token.

Referring now to FIG. 4C, a screen shot depicts one embodiment of a user interface confirming generation of a new token. As depicted in FIG. 4C, a user interface 406 displays information confirming that a number of tokens was generated as requested by the user.

Figure 4D:
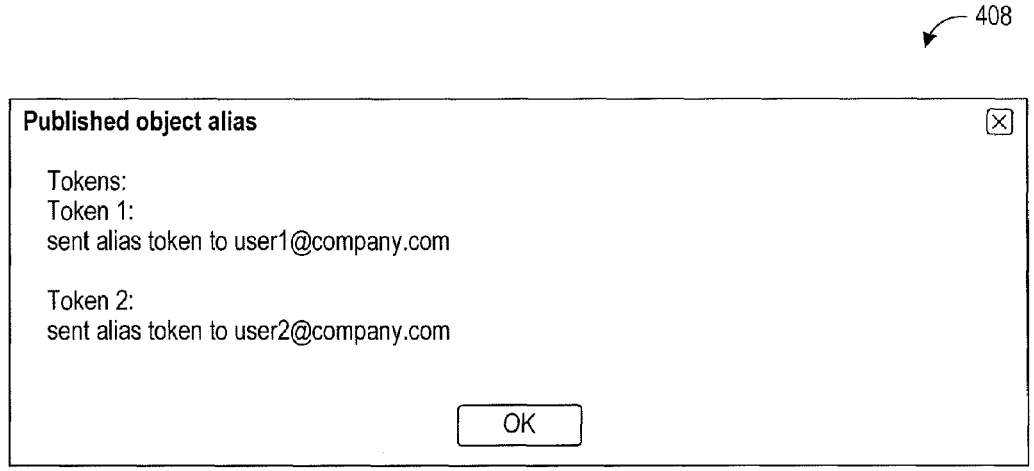
FIG. 4D is a screen shot depicting one embodiment of a user interface confirming completion of a publication of an alias.

Referring now to FIG. 4D, a screen shot depicts one embodiment of a user interface confirming completion of a publication of an alias. As depicted in FIG. 4D, a user interface 408 displays data confirming that an alias 208 was transmitted via email to a user of a particular organization.

Referring now to FIG. 4E, a screen shot depicts one embodiment of a user interface allowing a user to modify the access rights of a recipient of an alias for a translation memory object. As depicted in FIG. 4E, a user interface 410 displays data identifying types of actions that a recipient of an alias 208 is permitted to take. In one embodiment, in which the alias 208 is an alias for a translation memory object, the permissions that a user can control are the right to import data into the object, the right to export all segments of the object, the right to export the recipient's own segments of the object, the right to connect background links to the object, and the right to the object in a background link.

Referring now to FIG. 4F, a screen shot depicts one embodiment of a user interface allowing a user to modify the access rights of a recipient of an alias for a glossary object. As depicted in FIG. 4F, a user interface 412 displays data identifying types of actions that a recipient of an alias 208 is permitted to take. In one embodiment, in which the alias 208 is an alias for a glossary object, the permissions that a user can control are the right to import data into the object, the right to export data from the object, and the right to use the object as a link to terminology.

Referring now to FIG. 4G, a screen shot depicts one embodiment of a user interface allowing a user to modify the access rights of a recipient of an alias for a review object. As depicted in FIG. 4G, a user interface 414 displays data identifying types of actions that a recipient of an alias 208 is permitted to take. In one embodiment, in which the alias 208 is an alias for a review object, the permissions that a user can control are the right to connect to glossaries.

Figure 5A:
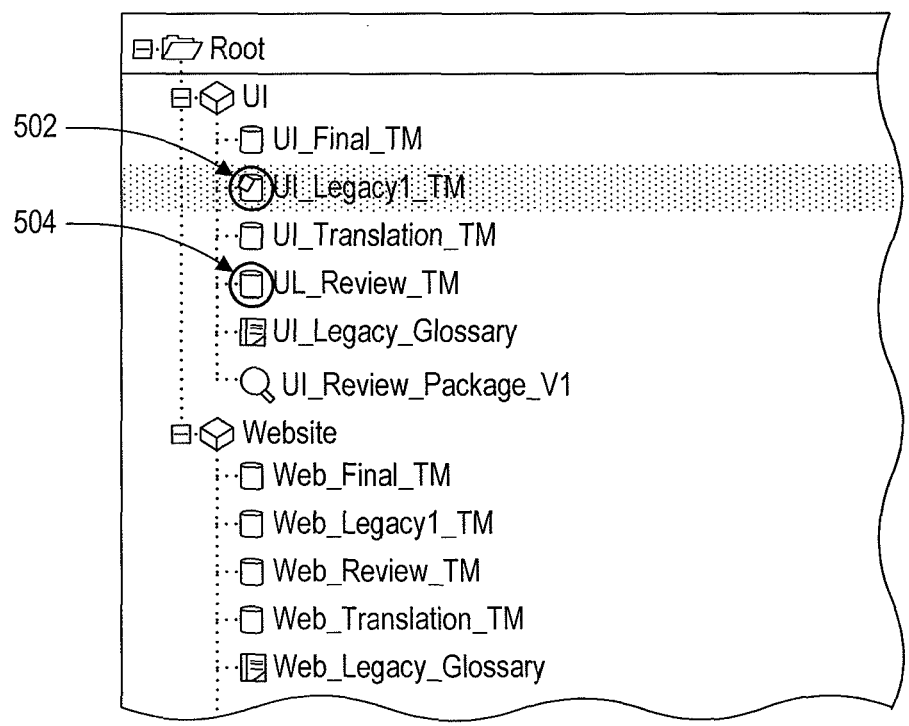
FIG. 5A is a screen shot depicting one embodiment of a graphical representation of an object for which a user has created an alias.
Figure 5B:
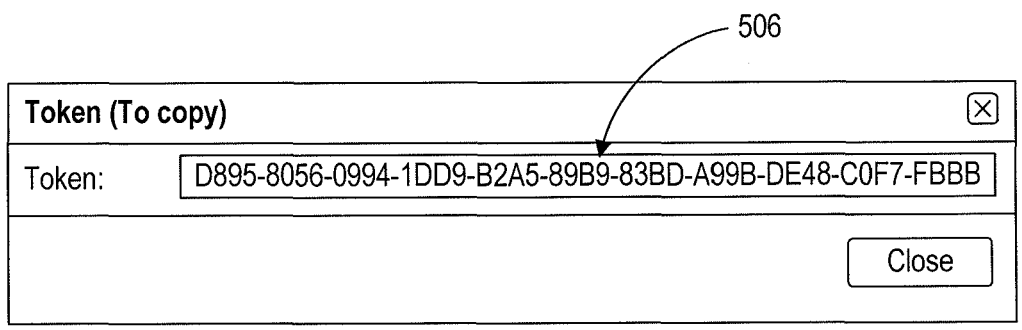
FIG. 5B is a screen shot depicting one embodiment of a user interface identifying a token for which an alias has been generated and published.

Referring now to FIG. 5A, a screen shot depicts one embodiment of a graphical representation of an object for which a user has created an alias. As shown in FIG. 5A, an icon 502 may be selected to represent the object 204a for which an alias 208 was created that is substantially different from an icon 504 selected to represent an object 204b for which an alias 208 has not yet been created. Referring now to FIG. 5B, a screen shot depicts one embodiment of a user interface 506 identifying a token for which an alias 208 has been generated and published. Referring now to FIG. 5C, a screen shot depicts one embodiment of a user interface 508 displaying an identification of an organization receiving access to a published alias 208.

Subscribing to an Alias

Figure 6A:
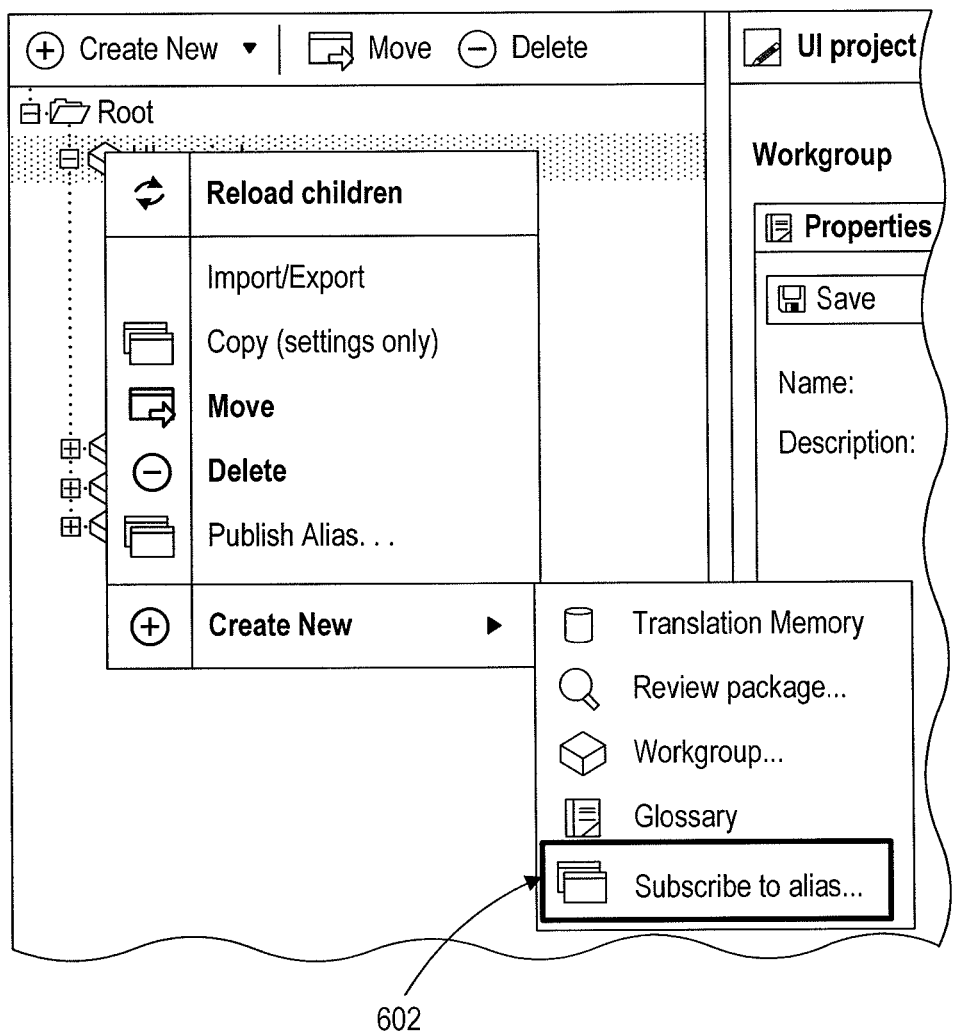
FIG. 6A is a screen shot depicting one embodiment of a user interface for making a received alias available for a user of a receiving organization.
Figure 6B:
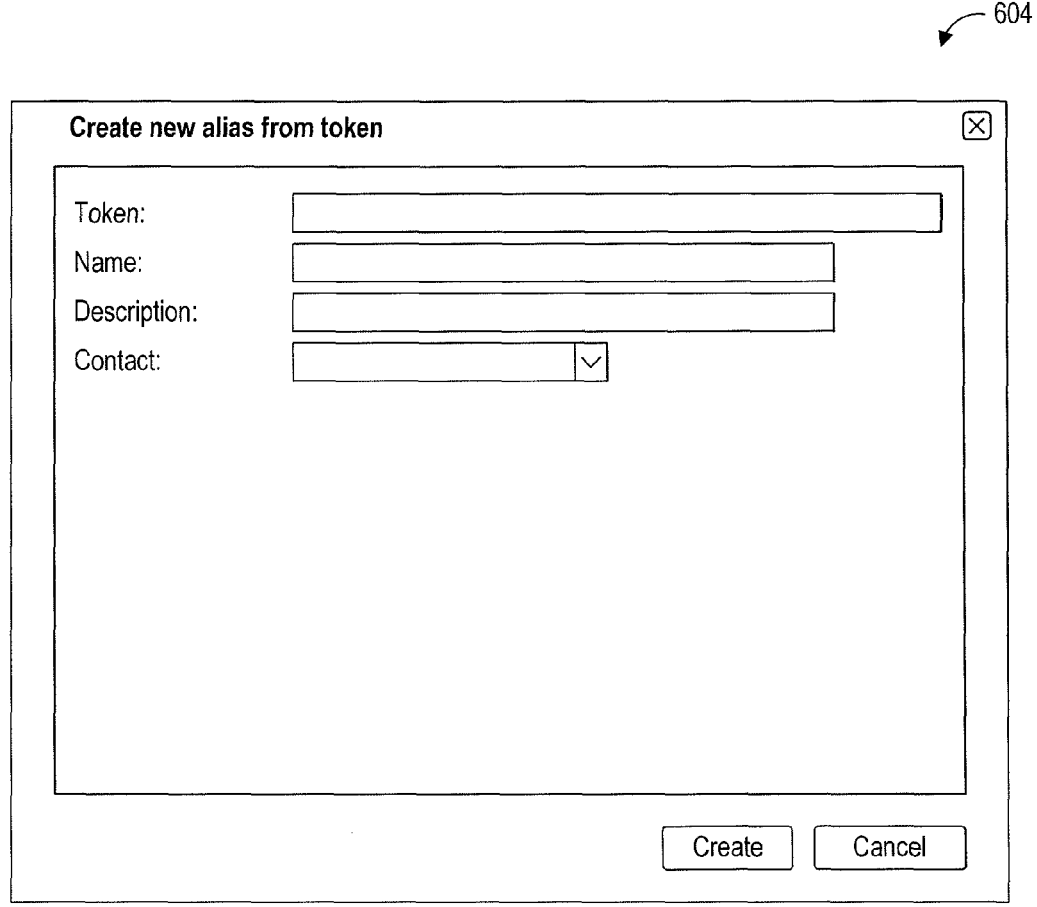
FIG. 6B is a screen shot depicting one embodiment of a user interface allowing a user of a receiving organization to generate a new alias.

Referring now to FIG. 6A, a screen shot depicts one embodiment of a user interface for making a received alias available for a user of a receiving organization. As shown in FIG. 6A, a user interface 602 allows a user to request a subscription to an alias 208. In some embodiments, a user of a first organization that owns an object 204 creates a token allowing a user of a second organization to access the object 204 by creating a new alias 208 for the object 204. In one of these embodiments, a user of an organization receiving a token for an object 204 makes the object available by subscribing to it via the user interface 602. Referring now to FIG. 6B, a screen shot depicts one embodiment of a user interface allowing a user of a receiving organization to generate a new alias. In one embodiment, a user interface 604 allows a user of a receiving organization to create an alias 208 for a received token. In other embodiments, the user of the first organization creates the new alias 208 using an interface substantially similar to the user interface 604 and transmits the new alias 208 to the user of the second organization.

Figure 6C:
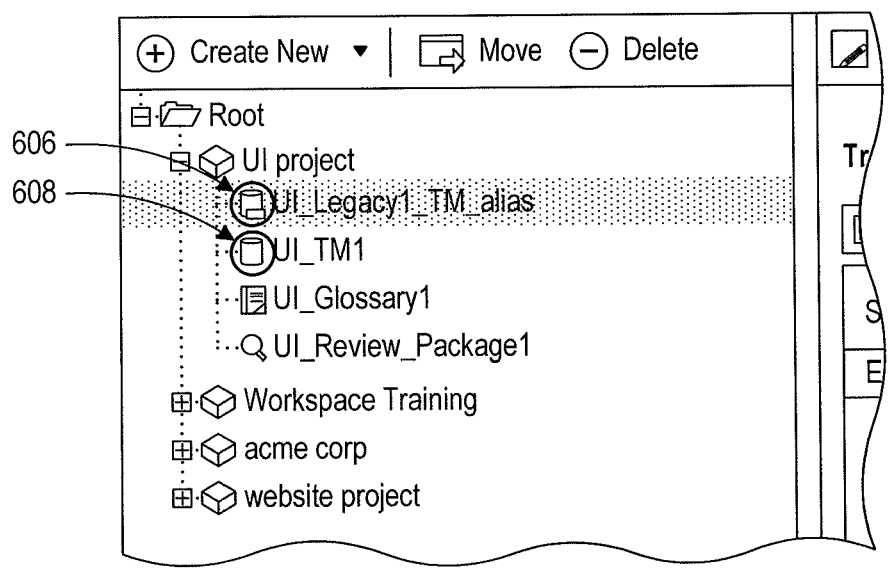
FIG. 6C is a screen shot depicting one embodiment of a graphical representation of an alias.

Referring now to FIG. 6C, a screen shot depicts one embodiment of a graphical representation of an alias 208. As shown in FIG. 6C, an icon 606 may be selected to represent the alias 208 for the object 204a. In one embodiment, the icon 606 is substantially different from an icon 608 selected to represent an object 204c residing within a workspace 206 for which an alias 212 has not yet been created.

Figure 7:
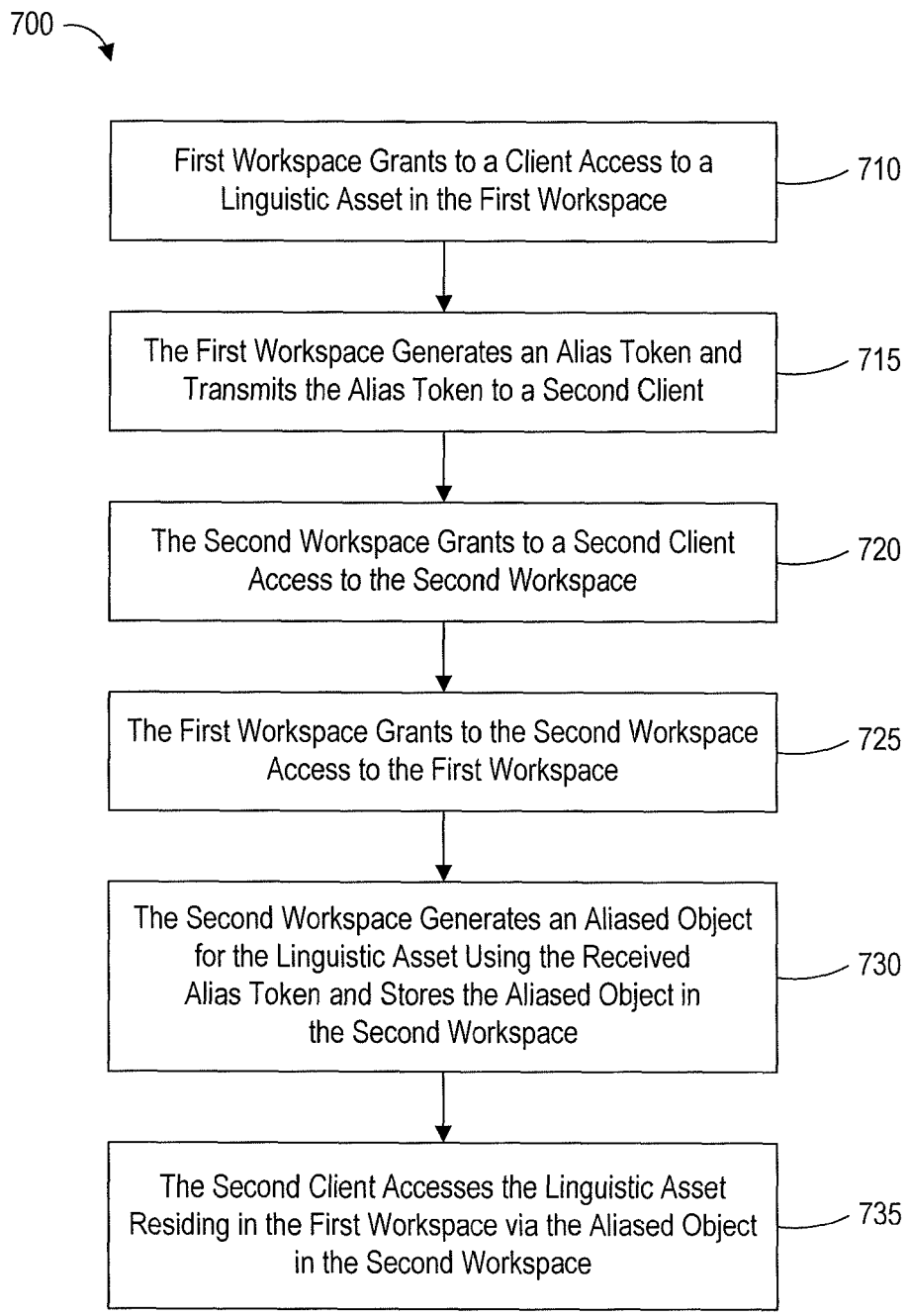
FIG. 7 is a flow diagram of a method for providing anonymous and traceable external access to internal linguistic assets.

Referring now to FIG. 7, a flow diagram depicting a method 700 for providing anonymous and traceable access to linguistic assets is depicted. In brief overview, at step 710 a first workspace 202 grants to a client 102a access to a linguistic asset 204a in the first workspace. At step 715, the first workspace 202 generates an alias token and transmits the alias token to a second client 102b. At step 720, the second workspace 206 grants to a second client 102b access to the second workspace 206. At step 725, the first workspace 202 grants to the second workspace 206 access to the first workspace 202. At step 730, the second workspace 206 generates an aliased object 208 for the linguistic asset 204a using the received alias token and stores the aliased object 208 in the second workspace 206. At step 735, the second client 102b accesses the linguistic asset 204a residing in the first workspace 202 via the aliased object 208 in the second workspace 206.

Further referring to FIG. 7, and in more detail, in one embodiment, a first workspace 202 grants to a client device 102a access to a linguistic asset 204a in the workspace 202. The client device 102a sends a request to the server 106a, requesting access to linguistic assets 204 residing in the workspace 202. A client request can be a request to access an application, service, or process executing or executed by the server 106. The access manager 250a determines if the client 102a has permissions to access the linguistic asset 204. The client 102 and server 106 can communicate over an established connection, such as by TCP/IP.

At step 715, the first workspace generates an alias token and transmits the alias token to a second client. In some embodiments, the alias token is created using a random number generator. In other embodiments, the alias token is created using random number, letters, symbols or any combination thereof. In other embodiments, the alias token is created using some identifying information about the client, the linguistic asset, or the first workspace and applies an algorithm to generate a token that may be comprised of numbers, letters or symbols. In some embodiments, the alias token may be a combination of words and dates associated with the asset. In some embodiments, the alias token may be generated using any of the methods described herein. In some embodiments, an alias manager 260a may generate the alias token. In some embodiments, the alias manager 260a may use a random number generator to create a token. In some embodiments, the alias manager 260a may access a pre-existing or pre-created token and associate the token with the identified linguistic asset 204a. In some embodiments, the alias manager 260 communicates with a random number generator and uses the number as a seed to generate an alias token to mask the identity of the user. In other embodiments, the alias manager 260 uses some identifying information of the user, such as an IP address or user account name and incorporates the data to generate an alias that appears to be random. In other embodiments, the alias manager 260 creates an alias token using an algorithm loaded into the system.

Once the alias token has been generated, the first workspace transmits the alias token to a second client. In some embodiments, the token may be transmitted through an email, text, or other type of correspondence. In other embodiments, the token may be transmitted through a secured connection, once the second client 102b logs into a webpage. In some embodiments, the token may be transferred to users through any means by which data can be transferred among users. In some embodiments, the token may be transmitted to several users. If the users belong to the same organization or group, then the tokens may be used by all the members of the group or organization. In some embodiments, only one user from a group or organization may use the token at a time. In other embodiments, all users may simultaneously use or use concurrently the token. If the users do not belong to the same organization or group, then the first organization or group that uses the token can establish control and users belonging to a different group may no longer use the given token. In such cases, members of the same organization can use the token, whereas if the user does not belong to the organization or group, then the token would no longer function properly and could not be used to generate an aliased object.

At step 720, the second workspace 206, grants to a second client 102b access to the second workspace 206. The access manager 250b receives a request from the remote client device 102b, requesting access to linguistic assets 204 residing in the first workspace 202. The access manager 250b may determine whether the client has permissions to access the linguistic asset 204. The remote client 102b and second server 106b can communicate over an established connection, such as by TCP/IP. In some embodiments, the second client 102b may be a user of an existing workspace 206. In some embodiments, the user may not be associated with any workspace. If the user is not associated with any workspace, in some embodiments the second client 102b may access a workspace for new users. In some embodiments, the workspace for new users may be a workspace with limited capabilities. In other embodiments, the workspace may be available to the client 102b for a limited amount of time. In some embodiments, the workspace may require the client 102b to sign up for a subscription to the workspace. In other embodiments, the workspace may invite the user of the client device 102b to join an existing workspace.

At step 725, the first workspace 202 grants to the second workspace 206 access to the first workspace 202. In some embodiments, the access manager 250a controls access to the workspace. The access manager executing in the first workspace 202 may communicate with the access manager in the second workspace 206. In some embodiments, the access manager in the first workspace may permit access by the second workspace 206 responsive to an existing policy. In other embodiments, the first access manager 250a may create a new policy to enable the second workspace 206 to access the first workspace 202. In some embodiments, the first access manager 250a may require authentication from the second workspace 206 each time the second workspace 206 wishes to connect. In some embodiments, the workspaces may be connected over TCP/IP. In other embodiments, the workspaces may be connected through a secure network connection. In some embodiments, the first workspace 202 and the second workspace 206 may reside on the same computing device. In other embodiments, the first workspace 202 and the second workspace may reside on different computing devices.

In some embodiments, the first workspace does not grant permission to the second permission to access the first workspace. Rather, all the workspaces of the system reside in a computing layer. Once an alias token is generated and transmitted to a second user, the second user can then use the alias token to establish a connection between existing workspaces. A connection manager residing in the computing layer receives a request from a workspace. The request may include the alias token which contains information embedded in the token that identifies the originating workspace that generated the alias token. In other embodiments, the connections manager receives an alias token and looks up the workspace that generated the alias token to identify the correct the workspace. The connection manager uses the alias token to identify the specific object or linguistic asset and the aliased object and establishes a connection between the two objects. The connection manager ensures that the workspaces in which the linguistic asset or the aliased object reside do not have access to the other workspace. Thus, a specific connection is established to link the aliased object and the linguistic asset identified by the alias token without permitting general access by the workspaces to each other.

At step 730, the second workspace generates an aliased object 208 for the linguistic asset 204a using the received alias token and stores the aliased object 208 in the second workspace 206. Once the client 102b logs into a workspace, the client device transmits the alias token received from the first workspace 202 to the second workspace. Using the received token alias, the second workspace communicates with the first workspace 202 over the established connection and generates an aliased object 208. The aliased object acts as a proxy object, in which the user of the second client device 102b may interact with the linguistic asset in the first workspace 202 without directly interacting with the asset 204a. This mechanism provides several useful features. For example, by using the aliased object 208, a user may access and use the asset 204a while shielding their individual identity to the first workspace 202. The first workspace will only be able to see the group or organization name associated with the workspace from which the user accesses the asset 204a through the aliased object 208. The mechanism also provides a means for allowing multiple users from different workspaces to access an asset 204a while shielding their identities from each other. The only identifying information regarding access of any asset is through the aliased object 208 in a workspace and the information is only visible to the workspace that generated the alias token which was used to generate the aliased object 208. Thus, identifying information is very limited and only accessible by the workspace that provided the token to enable the access through an aliased object 208.

In some embodiments, the receiver of an alias token may re-publish or re-transmit the token to a third party. In some embodiments, the alias manager 260 executing in the user's current workspace may generate a new alias token that relates to the original alias token. The alias manager 260 may set or determine the type of access available to a user. For example, the alias manager 260 may incorporate in the alias token that the user may only have READ access to a linguistic asset 204a. In some embodiments, the alias manager 260 may set the permissions so that the receiving user has both READ and WRITE access to the linguistic asset 204a through the aliased object 208 generates using the received token. In some embodiments, if a user re-transmits or re-publishes an alias token and transmits the token to a third party, the original party (i.e. the first workspace 202 where the linguistic asset resides) will not be able to access or see any identifying information about the third party nor will it know when the third party accesses the asset 204a. In some embodiments, this information may be stored at a system level, keeping track of all accesses by all aliased objects, but no workspace will have permissions to see or access such data. This data would only be available to the administrator of the system and not to any of the individual workspaces.

In some embodiments, each time a token is created or transmitted to another party, the issuing workspace will be able to see all of the identities of organization or groups that access the asset 204a. Within an organization or group, the workspace may track all users that access an aliased object 208. However, the information regarding individual users may not be published or known outside of the workspace. Whenever a user accesses the linguistic asset, either through an aliased object or through a chain of aliased objects, the only information visible to another workspace is the identity of the group or organization utilizing the workspace. User-level information is not available to neighboring or other workspaces. Additionally, group or organization identities may only be available to limited workspaces, such as workspaces that are deemed neighbors (on the same computing device or sharing the same resources) that may influence availability of resources to a workspace or to workspaces that provided an alias token.

At step 735, the second client 102b access the linguistic asset 204a residing in the first workspace 202 via the aliased object in the second workspace. In some embodiments, a client 102n may access the linguistic asset 204a through a series of aliased objects 208. In some embodiments, the system may limit the number of chains or aliased objects 208 of aliased objects 208. Some limitations may be enforced through pre-existing policies. In some embodiments, the system may not provide any limitations to the number or "depth" of aliased objects (aliased object of an aliased object of an aliased object).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing anonymous and traceable access to assets, it will now become apparent to one of skill in the art that other embodiments incorporating the concepts of the disclosure may be used.

What is claimed is:

1. A method for providing anonymous and traceable access to linguistic assets, the method comprising:
   (a) generating, by one or more processors associated with a first workspace associated with a first organization and having a linguistic asset, an alias token for a first client machine associated with a second organization;
   (b) transmitting, by the one or more processors associated with the first workspace, the alias token to the first client machine;
   (c) generating, by one or more processors associated with a second workspace associated with the second organization, an aliased object providing a link to the linguistic asset residing in the first workspace, using the alias token, wherein the aliased object includes an identification of the second organization and an identification of a user of the first client machine;
   (d) transmitting, by the one or more processors associated with the second workspace, via the aliased object, to the one or more processors associated with the first workspace, a message to perform an operation on the linguistic asset residing in the first workspace;
   (e) receiving, by the one or more processors associated with the second workspace, from the one or more processors associated with the first workspace, a request for data associated with the operation; and
   (f) responding, by the one or more processors associated with the second workspace, to the one or more processors associated with the first workspace, with a modified version of the aliased object including the identity of the second organization and concealing the identity of the user of the first client machine.

2. The method of claim 1, wherein the linguistic asset further comprises one of a translation memory and a glossary asset.

3. The method of claim 1, further comprising the first workspace and the second workspace residing on a first server.

4. The method of claim 1, further comprising the first workspace residing on a first server and the second workspace residing on a second server.

5. The method of claim 1, further comprising storing in a memory, by the second workspace, with the aliased object, a group identity of a user having access to the second workspace and modifying, via the aliased object, the linguistic asset.

6. The method of claim 1, further comprising storing in a memory, by the second workspace, a group identity of a user having access to the second workspace and re-transmitting the alias token.

7. The method of claim 1, further comprising:
   (g) generating, by one or more processors associated with the second workspace, a second alias token for the aliased object, the second alias token for a second client machine associated with a third organization;
   (h) generating, by one or more processors associated with a third workspace and associated with the third organization, a second aliased object providing a link to the linguistic asset residing in the first workspace, using the second alias token, wherein the second aliased object includes an identification of the third organization and an identification of a user of the second client machine;
   (i) transmitting, by the one or more processors associate with the third workspace, via the second aliased object, to the one or more processors associated with the second workspace, a second message to perform an second operation on the linguistic asset residing in the first workspace;
   (j) transmitting, by the one or more processors associated with the second workspace, to the one or more processors associated with the first workspace, the second message;
   (k) receiving, by the one or more processors associated with the second workspace, from the one or more processors associated with the first workspace, a request for data associated with the second operation; and
   (l) responding, by the one or more processors associated with the second workspace, to the one or more processors associated with the first workspace, with a modified version of the aliased object including the identity of the second organization and concealing the identity of third organization and the identity of the user of the second client machine.

8. The method of claim 7, further comprising storing in a memory, by the third workspace, with the second aliased object, a group identity of a user having access to the third workspace and modifying, via the second aliased object, the linguistic asset.

9. The method of claim 7, further comprising storing in a memory, by the third workspace, a group identity of a user having access to the third workspace and re-transmitting the alias token.

10. A non-transitory computer readable medium storing computer program instructions executable by at least one computer processor to perform a method, the method comprising:
   generating, by one or more processors associated with a first workspace associated with a first organization and having a linguistic asset, an alias token for a first client machine associated with a second organization;
   transmitting, by the one or more processors associated with the first workspace, the alias token to the first client machine;
   generating, by one or more processors associated with a second workspace associated with the second organization, an aliased object providing a link to the linguistic asset residing in the first workspace, using the alias token, wherein the aliased object includes an identification of the second organization and an identification of a user of the first client machine;
   transmitting, by the one or more processors associated with the second workspace, via the aliased object, to the one or more processors associated with the first workspace, a message to perform an operation on the linguistic asset residing in the first workspace;
   receiving, by the one or more processors associated with the second workspace, from the one or more processors associated with the first workspace, a request for data associated with the operation; and
   responding, by the one or more processors associated with the second workspace, to the one or more processors associated with the first workspace, with a modified version of the aliased object including the identity of the second organization and concealing the identity of the user of the first client machine.

11. The non-transitory computer readable medium of claim 10, wherein the method further comprises generating, by one or more processors associated with the second workspace, a second alias token for the aliased object, the second alias token for a second client machine associated with a third organization;

generating, by one or more processors associated with a third workspace and associated with the third organization, a second aliased object providing a link to the linguistic asset residing in the first workspace, using the second alias token, wherein the second aliased object includes an identification of the third organization and an identification of a user of the second client machine;

transmitting, by the one or more processors associated with the third workspace, via the second aliased object, to the one or more processors associated with the second workspace, a second message to perform a second operation on the linguistic asset residing in the first workspace;

transmitting, by the one or more processors associated with the second workspace, to the one or more processors associated with the first workspace, the second message;

receiving, by the one or more processors associated with the second workspace, from the one or more processors associated with the first workspace, a request for data associated with the second operation; and responding, by the one or more processors associated with the second workspace, to the one or more processors associated with the first workspace, with a modified version of the aliased object including the identity of the second organization and concealing both the identity of third organization and the identity of the user of the second client machine.

* * * * *